3,166,472
Patented Jan. 19, 1965

3,166,472

ANTHELMINTIC COMPOSITIONS AND METHOD OF EMPLOYING SAME

Jacob J. Menn, Kirkwood, Mo., and Frank B. Folckemer, Union, and Alexander Miller, Short Hills, N.J., assignors to Shell Oil Company, New York, N.Y., a corporation of Delaware No Drawing. Filed Jan. 12, 1962, Ser. No. 165,941
6 Claims. (Cl. 167—53)

This invention relates to a method for controlling endoparasites in mammals and birds, particularly in domestic animals and poultry.

Control of endoparasites—that is, internal parasites—of mammals and birds is one of the most important problems now encountered in animal husbandry. The magnitude of the problem is evident from the fact that internal parasites of livestock and poultry currently account for about half a billion dollars annual loss at the farm level, and that about twelve million dollars a year at the manufacturing level is spent annually for anthelmintics to control such parasites. Further losses, and costs for control of internal parasites are encountered in the raising of fur-bearing animals, domestic pets and the like. The parasites of major importance are the helminths—the internal worms.

The discovery of an effective, yet safe, anthelmintic has proven to be very difficult, for a successful anthelmintic must satisfy severe and in some ways contradictory requirements. Thus, a successful anthelmintic must; (*a*) be toxic to a wide spectrum of internal parasites; (*b*) not injure the host animal at the parasiticidally effective dosages; (*c*) be capable of ready introduction into the host animal by means which are adaptable to the treatment of few or many animals—preferably by incorporation into the animal's feed and/or water, which requires that the material be palatable to the animal; (*d*) be sufficiently stable in gastric juices and/or other body fluids and/or resist attack by microbes in the host animal that it can remain in the animal for a time sufficient to kill and/or cause elimination of the parasites from it; (*e*) not build up in concentration in the host animal—must be metabolized and/or excreted from the animal after it has done its job. In the case of ruminants, the successful anthelmintic also is one which does not adversely affect the microflora present in the rumen, for the presence of the microflora in the rumen is essential to conversion of cellulose materials to low molecular weight fatty acids which the ruminant can assimilate.

Since about 1956, organophosphorus compounds of various kinds have been investigated as possible anthelmintics, and many have been found to have potential value for this purpose. The organophosphorus anthelmintics have proven to have certain drawbacks however. All are more or less toxic to mammals and in many cases the safety factor—the difference between the parasiticidally effective dosage and the dosage which is toxic to the animal host—is so small that extreme care must be taken in using these anthelmintics, and despite the greatest care it is not unusual to find the host animals adversely affected by the anthelmintics. Further, the phosphorus anthelmintics do not seem to act consistently, particularly where the host animal is a ruminant. A possible explanation for this behavior appears to lie in the physical make-up of the animal: the parasites to be controlled are usually present in the abomasum and/or the intestines, and to contact them, the anthelmintic must pass through, and be subjected to the effects of the fluids and microorganisms in the rumen, the reticulum and the omasum of the animal; organophosphorus compounds appear to be insufficiently stable to enable them to pass unchanged through these parts of the ruminant digestive system. Also, the absorption of chemicals is readily effected in the rumen, so that the organophosphorus compound may be removed therein and not pass on to the abomasum. In the case of monogastric animals, the instability of the phosphorus compounds would appear to be a factor in their sometimes inconsistent anthelmintic effects. A further drawback of the phosphorus anthelmintics is the fact that many of them have been found to be unpalatable to animals, and to render food with which they are mixed unpalatable to animals. In the cases of these anthelmintics, special techniques such as drenches must be used to introduce them into the animals—such materials cannot be simply mixed with the animals' food and/or water. These materials therefore do not lend themselves readily for treatment of large numbers of animals.

It is thus evident that while organophosphorus compounds are of substantial interest as potential anthelmintics, a number of serious problems must be solved before the potential value of such compounds as anthelmintics can be realized, and they can be used effectively yet safely for controlling internal parasites of animals.

Of particular interest as an anthelmintic is dimethyl 2,2-dichlorovinyl phosphate, known in the art as DDVP. In this specification it will be referred to hereinafter for brevity as DDVP.

It has now been discovered that DDVP can be used more effectively, and much more safely, if it is incorporated in polyvinyl chloride resins, and the resulting compositions used to treat the host animals. Used in the form of granules, powders or dusts, these compositions are palatable to animals—foods in which they are mixed are readily eaten by animals. The anthelmintic slowly passes from the body of the composition to the surface thereof, and the anthelmintic on the surface of the composition is available to act as the active anthelmintic. Thus, incorporation of the anthelmintic in the resin conserves the anthelmintic, yet making the anthelmintic available at controlled rates to destroy the parasites—there is made available on the surface of the particles of the composition sufficient of the anthelmintic to destroy the parasites, but the remainder of the anthelmintic is kept within the particles of the composition and thereby prevented from contact with gastric juices and other body fluids and/or microbes which would cause its decomposition. As a result, in a ruminant for example, the resin-anthelmintic formulation will pass through the rumen, reticulum and omasum without loss of effectiveness against the parasites in the abomasum and intestine. By proper choice of resin, the rate at which the anthelmintic passes from the inside to the surfaces of the particles of the composition can be controlled to effectively destroy and/or eliminate the parasites from the host animal within the time period during which the formulation is present in the abomasum and intestine. By incorporating the anthelmintic in the polyvinyl chloride resin, the effectiveness of the anthelmintic is retained, and the safety factor is markedly increased without reducing the effectiveness of the anthelmintic. A further advantage of the use of the resin-anthelmintic composition is the fact that the composition present in the feces remains effective, thus killing the larvae of endoparasites therein, and the larvae of insects which lay eggs in the feces. Since the DDVP also is insecticidal, insects feeding on the feces also will be controlled.

Considered in a generic sense, therefore, the present invention comprises an improved method for controlling endoparasites in mammals and birds, which method comprises orally administering to an infested mammal or bird a parasiticidally effective dosage of a composition comprising DDVP in intimate admixture with a polyvinyl chloride resin.

Polyvinyl chloride resins are suitable for forming the resin-anthelmintic compositions for use in the method of this invention. The essential characteristics of the suitable resins are that they be solids at temperatures encountered in storerooms and in fields, that they not absorb any appreciable amount of water (that they absorb at most about 2 percent and preferably less than 1 percent of its weight of water) and that they have substantial miscibility with the insecticide used in the preparation of the granular formula. Preferably the resin used is completely hydrophobic. These requirements are satisfied by the polymers and copolymers of polyvinyl chloride having a molecular weight of 5000 or above..

In many cases, intimate mixing will readily effect introduction of the DDVP into the resin. In other cases, it may be desirable to employ a solvent to aid in introducing the DDVP into the resin. Fluid pastes, or "plastisols," can be made which can be molded, extruded, cast, blown or otherwise formed into such other shapes as sheets, films, rods, granules, foams, powders and the like. In some cases, the mixture of the DDVP and the resin must be heated, preferably in a closed vessel up to about 100° C. or higher to achieve solidification, or "fusion," of the resin. Alternatively, the DDVP may be incorporated in the resin by milling, by the use of mutual solvents, and by other similar blending methods.

The amount of the DDVP incorporated into the resin will depend upon physical character of the resin, and upon the intended physical state of the final product—whether granular, powdered, solid, foam, or the like. The critical factor in every case is the rate at which it is desired that the DDVP anthelmintic become available at the surfaces of the particles of the resin DDVP compositions, and will be determined in a given case by preliminary examination readily conducted by one ordinarily skilled in the art. For ready handling, it is desirable that the composition be dry and solid to the touch, and free-flowing. To insure this state, it is necessary to maintain the concentration of DDVP in the composition below about seventy percent by weight. To reduce the amount of resin which must be used, it is ordinarily desirable that the concentration of DDVP be at least about five percent of the weight of the composition, and ordinarily is at least about twenty percent of the weight of the composition.

The compositions prepared in this way consist of the DDVP in solid solution in the resin, the DDVP being present substantially unchanged chemically.

The preparation of suitable resin DDVP compositions is described in detail in co-pending application Serial No. 85,445, filed January 30, 1961, and in the interest of brevity the here-pertinent portions of that application are incorporated herein by reference to further describe the preparation and properties of such compositions. The compositions whose preparation is described in general, and in detail in the examples included in, the said co-pending application, are all suitable in the method of this invention.

The DDVP-polyvinyl chloride compositions of this invention are effective against a wide spectrum of endoparasitic organisms, and are particularly effective against the endoparasitic roundworms, pinworms, whipworms, threadworms, cecal worms, stomach worms, hairworms, threadnecked worms, cooperias, and the like. In some cases the DDVP-polyvinyl chloride compositions act topically, while in other cases act systemically, and thus can control such endoparasites as the larvae of heel flies, bomb flies, bot flies and the like. For example, DDVP has been found to be an effective anthelmintic for species of Haemonchus, Trichostrongylus, Ostertagia, Cooperia, Trichuria, Oesophagostomum, Strongyloides, Ascaris, Nematodirus, Gasterophilus, to name but a few. DDVP also can be used to control flatworms (of the Cestoda, such as those of Hymenolepsis). DDVP is effective in controlling endoparasites of mammals and birds, generally, and more particularly, in controlling endoparasites in livestock, such as cattle, swine, sheep, and goats, in domestic pets, such as dogs and cats, in rabbits, in poultry such as chickens, turkeys, geese and the like, in fur bearing animals such as mink, foxes, chinchilla, and the like.

The DDVP-resin compositions can be used to eradicate parasites already present, and/or they can be used prophylactically—in other words, they can be used to cure already present worm infestation and can be used to prevent infestation.

The dosage of the anthelmintic to be used will depend upon the particular kind or kinds of parasites to be controlled, the particular anthelmintic resin composition to be used, the kind of host animal, whether the anthelmintic is to be used to cure an already existing infection, or merely as a prophylactic, and the like. These factors are those ordinarily encountered in the treatment of animals to cure and/or prevent their infestation by endoparasites; these factors and their solution all are well known to the practitioners of the art. In general, however, larger dosages are required to cure an already existing infestation than are required for prophylaxis. Thus, dosages of the DDVP-resin anthelmintic composition to provide as little as 1 milligram of the DDVP per kilogram of the live body weight of the animal fed at regular intervals—twice daily or daily, for example—may be sufficient to prevent infestation of animals by endoparasites. However, prophylactic dosages ordinarily will amount to about 15–25 milligrams of the DDVP per kilogram of the animal body weight. The dosage required to eradicate already existing endoparasites ordinarily will be at least about 10 milligrams of the DDVP per kilogram of the animal body weight, with usual dosages being about 20 to 50 milligrams on the same basis. The maximum dosage, of course, in every case will be determined by the toxicity of the anthelmintic to the host animal. By proper choice of resin, the resin-anthelmintic compositions used in the method of this invention provide an excellent safety factor—effectively eradicating endoparasites without ill effect upon the host animal.

For best results, the resin-anthelmintic composition should be present in the gastro-intestinal tract of the host animal in the form of particles. Consequently, it is preferred that the composition be in the form of particles, by which is meant granular forms, powders and dusts. These compositions are palatable to animals, and accordingly can be incorporated in animal feeds. If desired, however, the compositions can be suspended in water, milk, or the like, and given as a drench, or the compositions can be formed into tablets, or the like, or encapsulated, for introduction into the animal.

The method of this invention also contemplates combination of the DDVP anthelmintic with phenothiazine, since phenothiazine and the DDVP anthelmintics are mutually activating anthelmintics, giving more than additive—i.e., synergistic—results as regards control of many endoparasites. The combination of the DDVP and phenothiazine thus permits the use of reduced amounts of both materials without reduction in the control of the parasites—in this way increasing the safety factor. The mixtures of DDVP and phenothiazine are incorporated in the resin for use in the method of this invention. Ordinarily, from about 0.1 to about 1.0 part by weight of the DDVP is used per part by weight of phenothiazine.

The efficacy of the method of this invention for controlling internal parasites in animals is demonstrated by the following experiments and the results thereof which show use of the method in particular instances.

*Example I*

10 ewes, each weighing about 150 pounds, live weight, with suckling lambs, infested with *Haemonchus contortus* (common stomach worm, a roundworm), were treated in a single dose with a granular mixture of dimethyl 2,2-dichlorovinyl phosphate and polyvinyl chloride containing 25% by weight of the phosphate, the dosage being 50 milligrams of the phosphate per kilogram of body weight. Egg fecal counts were made on each individual animal and larvae cultures for identification were made. The ewes were passing an average of 3,000 eggs per gram of feces, of which about 80% were *H. contortus* eggs. Based on a 7–9 day posttreatment fecal egg count and larva identification, a marked reduction in the number of eggs being passed by the ewes treated with the phosphate-resin composition was found. For example, on one particular animal, the fecal egg count dropped from 5,200 eggs per gram of feces to zero, while in an another animal, the egg count dropped from 4,800 eggs per gram of feces to 200 eggs per gram of feces. No evidence of toxicity due to the phosphate was noted.

It is to be noted that these ewes had, previous to the above tests, been treated with standard dosages of phenothiazine, a standard anthelmintic, and that the parasites resisted this drug, since the ewes were not freed of the parasites.

*Example II*

30 lambs, all from the same flock, were used; none had been given any anthelmintic prior to the test. Five lambs were treated with single doses of a granular mixture of dimethyl 2,2-dichlorovinyl phosphate and polyvinyl chloride containing 25% by weight of the phosphate. Five lambs were treated with single doses of a water suspension of a powdered mixture of dimethyl 2,2-dichlorovinyl phosphate and polyvinyl chloride containing 5% by weight of the phosphate. Dosage in all cases: 50 milligrams per kilogram of body weight. Fecal egg counts were made twice before treatment, once 5 days before treatment and once just before treatment, then were made 5 days and 12 days after treatment. 12 days after treatment the lambs were sacrificed and examined for infestation by parasites. The following results were obtained (in all cases egg counts are the number of eggs per gram of feces per animal, average):

(1) The powdered composition reduced the egg count of *H. contortus* from 82 before treatment to 15 at the end of the test (12th day after treatment). Post mortem examination showed that three of the treated lambs were free from infestation by this parasite at the end of the test, and that on the average, based on comparison of worm counts of the treated animals and worm counts of the non-treated animals, the powdered composition had reduced the number of adult worms by 99.7%.

The granular composition reduced the egg count of *H. contortus* from 46 (before treatment) to 7 (end of test), and reduced the number of adult worms by 99.2%. Two of the lambs were free from infestation by this parasite.

For comparison, it was found that at the end of the test, the untreated lambs were passing an egg count of 1941. All of the untreated lambs were infested at the end of the test.

(2) Both the powdered and granulated compositions sharply reduced the egg count of *Ostertagia osctertagia* (brown stomach worm) and reduced the number of adult worms of this kind by 97% and 95%, respectively.

(3) Both compositions reduced the egg count of a species of Trichostrongylus that was present. The powdered composition reduced the number of adult worms of this species by 78.5%, while the granulated composition reduced the number of adult worms of this species by 66.6%.

(4) The powdered composition reduced the number of adult worms of a species of Nematodirus present by 94.4%, while the granular composition reduced the number of adult worms of this species by 93.4%.

(5) A species of Strongyloides was present. Because this parasite is so small, mechanical difficulties prevented obtaining valid post mortem data. At the end of the test, the untreated lambs were pasing an average of 439 eggs per gram of feces per animal, while the lambs treated with the granular composition were passing an average of but 45 eggs per gram of feces per animal, and the lambs treated with the powdered composition were pasisng even fewer eggs: 6.5 per gram of feces per animal.

(6) The lambs were lightly infested with a species of Cooperia, the infestation being too light to obtain valid post mortem data; treatment with the insecticide-resin composition markedly reduced the egg counts: at the end of the test, the average egg counts were: untreated animals: 656; animals treated with powdered composition: 4; animals treated with granular composition: 2.

(7) A species of Trichuris also was present. The powdered composition reduced the number of adult worms of this species by 98.3%; the granular composition reduced the number of adult worms of this species by 91.9%. Both forms of the composition drastically reduced the egg counts.

(8) Both forms of the composition gave excellent control of a species of Capillaria that was present: the powdered composition reduced the number of adult worms of this species by 92.9%, while the granular composition reduced their number by 100%. Egg counts were correspondingly drastically reduced by both compositions. It is of interest to note that Le Page, "Veterinary Parasitology," states that "no drug is known that will effectively remove any of the species of Capillaria."

In these tests, all of the parasites were located in the abomasum, except the species of Trichuris (present in the caecum) and Cooperia (present in the small intestine). The resin-DDVP formulation thus was effective against intestinal parasites as well as stomach parasites.

The anthelmintic composition did not appear to have any adverse effect upon the microflora present in the rumen of the lambs.

It has been found that dimethyl 2,2-dichlorovinyl phosphate is rapidly metabolized in mammals, and that it does not build up in their bodies.

The compositions of dimethyl 2,2-dichlorovinyl phosphate and polyvinyl chloride are palatable to animals, and food containing them is readily eaten by animals.

It will be found advantageous in many cases to employ phenothiazine in combination with dimethyl 2,2-dichlorovinyl phosphate.

We claim as our invention:

1. A method for controlling internal parasitic worms in warm-blooded animals which comprises orally administering to the animal a parasiticidally effective dosage of a composition comprising dimethyl 2,2-dichlorovinyl phosphate in solution in a polyvinyl chloride resin.

2. A method according to claim 1 in which the phosphate-resin composition is administered in the animal's feed.

3. A method for controlling internal parasitic worms in mammals which comprises orally administering to an infected mammal a parasiticidally effective dosage of a composition comprising dimethyl 2,2-dichlorovinyl phosphate in solution in polyvinyl chloride resin.

4. A method according to claim 3 in which the phosphate-resin composition is administered in the mammal's feed.

5. A composition for controlling internal parasitic worms in warm blooded animals, said composition comprising an animal feed containing an anthelmintic dosage of a composition comprising dimethyl 2,2-dichlorovinyl phosphate in solution in a polyvinyl chloride resin.

6. A composition for controlling internal parasitic worms in mammals, said composition comprising an animal feed containing an anthelmintic dosage of a composition comprising dimethyl 2,2-dichlorovinyl phosphate in solution in polyvinyl chloride resin.

References Cited in the file of this patent

UNITED STATES PATENTS

| | | |
|---|---|---|
| 2,929,762 | Wasco | Mar. 22, 1960 |
| 2,944,937 | Moyle | July 12, 1960 |

FOREIGN PATENTS

| | | |
|---|---|---|
| 217,287 | Australia | Sept. 16, 1958 |

OTHER REFERENCES

Plasdone: G.A.F. Corp., New York, N.Y., June 15, 1951, pages 17 to 19.

Piney: Brit. Med. Journal, July 3, 1954, pages 48 and 49.

J.A.P.A., vol. 15, October 1954, pages 591–592.